UNITED STATES PATENT OFFICE.

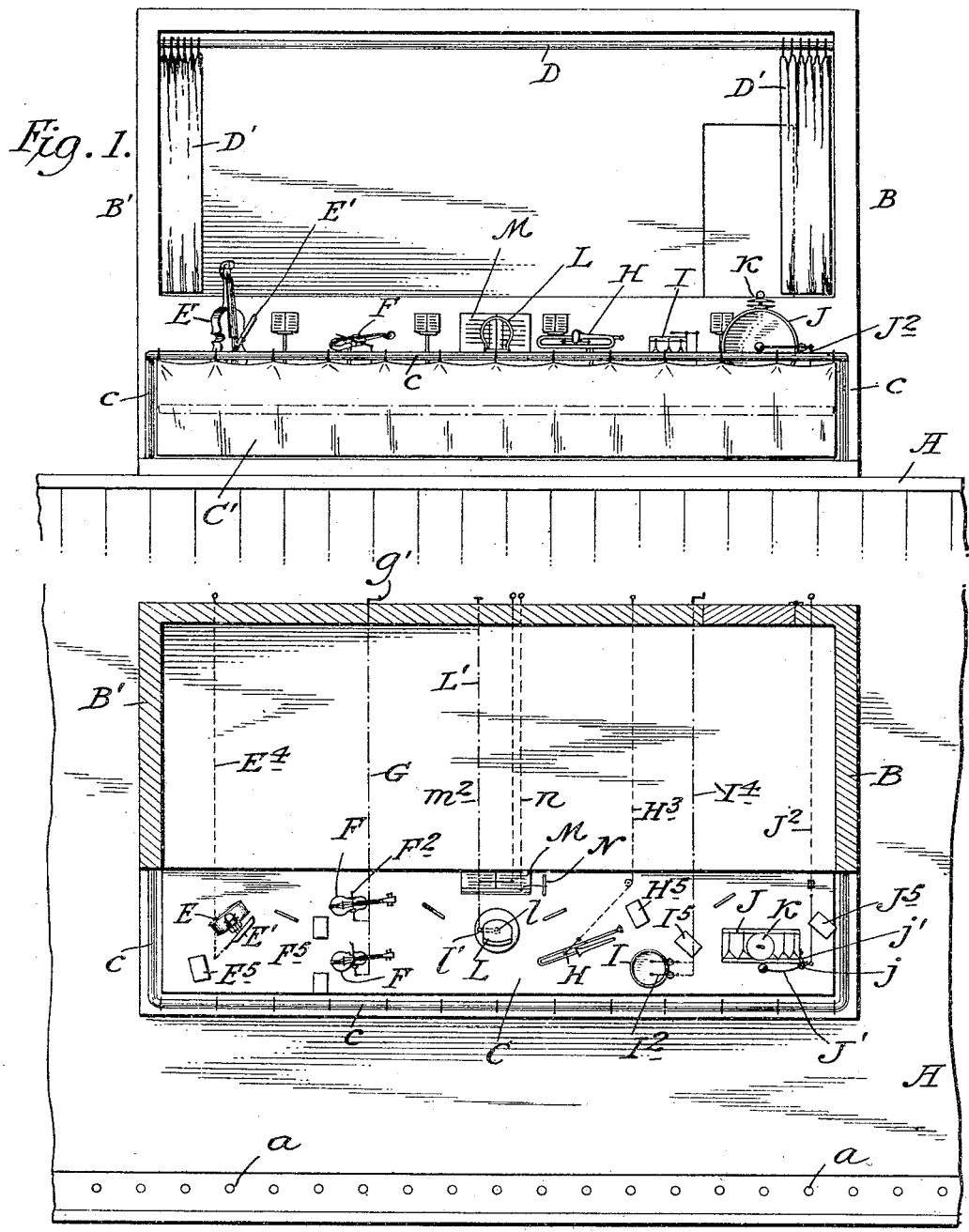

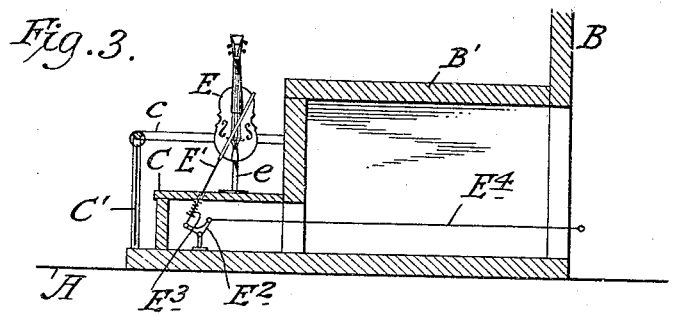
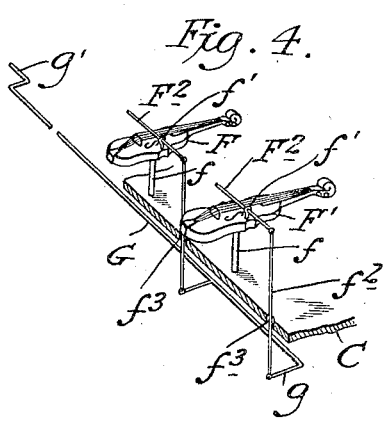
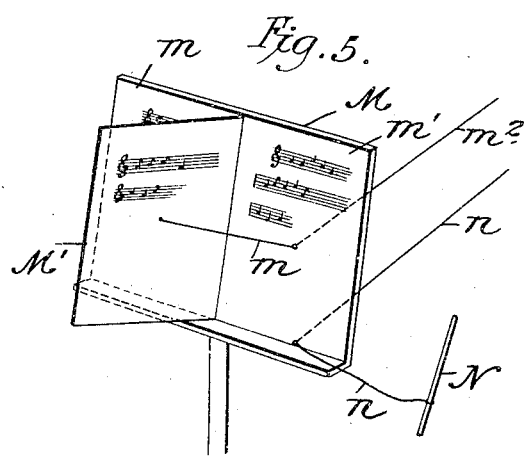
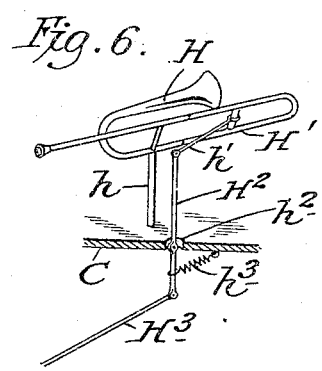
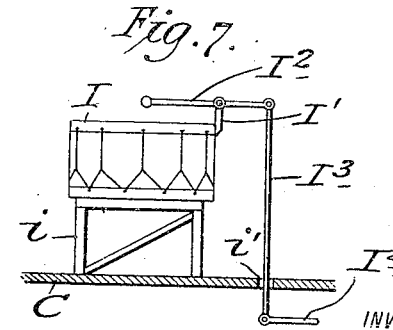

HARRY ROCHEZ, OF TWICKENHAM, LONDON, ENGLAND.

THEATRICAL APPLIANCE.

950,786. Specification of Letters Patent. Patented Mar. 1, 1910.

Application filed October 8, 1909. Serial No. 521,734.

*To all whom it may concern:*

Be it known that I, HARRY ROCHEZ, a subject of the King of Great Britain, residing at Barry Lodge, Clifton Gardens, Twickenham, London, W. C., England, have invented a new and useful Theatrical Appliance, of which the following is a specification.

This invention is a theatrical appliance.

The object of said invention is to afford entertainment to a theatrical audience by conveying the impression that musical instruments are played by trained animals.

In a practical embodiment of the invention I employ a stage setting which, preferably, resembles a minature stage with curtains, etc., a number of instruments, preferably musical instruments, stationed on the stage, each instrument being adjacent to a chair to be occupied by one of the animals, and means concealed from the view of the audience whereby the instruments may be operated in such manner as to give the appearance of being played by the animals.

The instruments which I prefer to use resemble those of a musical orchestra, such as violins, trombones and drums. In addition to the instruments, a separate station is provided for the leader adapted to be placed in front of a music stand. The leader's station, baton, and music sheets are operated separately. With each instrument is associated appropriate means for operating a movable part of the instrument, such as the bow of the violin, the slide of the trombone, and the sticks of the snare drum and the bass drum. The animals used may be monkeys, although it is evident that other animals may be trained to carry on the performance, and that dummies or manikins may be employed.

In the accompanying drawings I have illustrated one practical embodiment of the invention, but the construction shown therein is to be understood as illustrative, only, and not as defining the limits of the invention.

Figure 1 is a front elevation illustrating my theatrical appliance in position on an ordinary stage. Fig. 2 is a plan view of the stage and the appliance in position thereon, said appliance being shown partly in horizontal section. Fig. 3 is a vertical cross section through the appliance as it appears upon a stage. Figs. 4, 5, 6 and 7 are detail views illustrating various devices employed in my theatrical appliance, illustrating more particularly the means for operating the several devices.

In order that others may understand my invention, I have illustrated it in position upon an ordinary stage, A, the latter having the usual foot lights, $a$.

My invention comprises an appliance indicated in its entirety by the reference character B. Said appliance is provided with a platform, C, around which is a railing, $c$, adapted for supporting a curtain, C'. The rear part, B', of the appliance is raised somewhat above the platform, C, and in the upper part of this raised rear part, B', is a curtain pole, D, adapted to support suitable curtains, D'. The raised rear part, B', of the appliance may be provided with appropriate scenery adapted to be displayed, when curtains, D', are opened, back of the orchestra, and a troupe of trained animals stationed on the platform, C.

While I have illustrated and described the theatrical appliance as embodying the several curtains and the background, still it will be understood that the invention is not strictly confined to these accessories, it only being necessary to provide the theatrical appliance with a suitable platform or stage on which is positioned the various instruments or devices and means for supporting the troupe of trained animals or dummy figures.

In the several figures of the drawings the instruments are shown as embodied in musical instruments ordinarily employed in theatrical orchestras, and I will now proceed to describe them in detail.

E designates a bass viol adapted to be supported on platform, C, by a post, $e$, so that the viol will be exposed to the view of the audience over railing, $c$, and curtain, C'. The bow, E', of the viol passes through an opening in platform, C, and its lower end is connected to a lever, $E^2$. The bow is drawn normally in one direction by a spring, $E^3$, and to the lever, $E^2$, is connected a pull rod, $E^4$, extending to the rear of the stage appliance, B, so as to be in convenient reach of an operator. Adjacent to the bass viol, E, is a chair or settee, $E^5$, on which one animal of a troupe is adapted to be stationed so as to grasp the viol, E, but while the animal and a part of the viol are exposed to the view of the audience, the means for operating the movable member of the viol are concealed by the platform from the audience.

F, F' designate violins which are supported by posts, f, upon platform, A, as shown in Fig. 4. With each violin is associated a bow, F², adapted to play in a fixed guide, f'. To the bows of the violins are connected the upstanding links, f², which pass loosely through openings, f³, in the platform, C. The lower ends of said links are pivoted to crank arms, g, on a horizontal rock shaft, G, the latter extending rearwardly through the appliance, B, and said rock shaft being provided at its rear end with a suitable operating crank, g', see Figs. 2 and 4. The operator at the rear of the stage setting can operate the crank g', for the purpose of rocking shaft, G, the arms, g, of which operate the links, f², and thus impart motion to the bows, F², of the violins.

H designates a trombone supported in a raised position on platform, C, by a post, h. The slide, H', of the trombone is connected by a link, h', to an operating lever, H², the latter passing loosely through an opening, h², in the platform. Said lever is fulcrumed on the platform, as shown in Fig. 6, and to it is connected a spring, h³, and an operating cord, H³, the latter extending rearwardly through the stage setting, as shown in Fig. 2.

The snare drum, I, is supported in a raised position on platform, C, by a base, i. Extending upwardly from the drum is a short post, I', on which are pivoted the drum sticks, I². The rear ends of the drum sticks are connected pivotally to a vertical operating member, I³, which passes loosely through an opening, i', in the stage, and said member, I³, is connected to a rock shaft, I⁴, extending rearwardly through the stage appliance.

The bass drum, J, is supported on the platform so as to be visible over curtain, C', and the drum stick, J', is pivoted at j to a side of the drum. This drum stick is acted upon by a spring, j', the position of which is indicated in Fig. 2, and depending from the drum stick is a link, j², connected to an operating member, J², extending rearwardly through the stage setting. With the drum, J, are associated the cymbals, K, which may or may not be operated by suitable connection with the member, J².

Erected on the platform, C, is a chair or stool, F⁵, adjacent to the violins, F, F', another chair or settee, H⁵, adjacent to the trombone, H, another chair or settee, I⁵, adjacent to the snare drum, and a chair, J⁵, quite close to the bass drum. These several chairs are provided for the accommodation of the animals comprising the troupe which are adapted to be positioned on the stage, C, adjacent to the several instruments for the purpose of making it appear to the audience that the animals perform on said instruments. As a matter of fact, however, the animals occupy their respective stations quite close to the instruments, and they may be trained to grasp a part of the instrument; but the actual movement is imparted to the several parts of said instruments by one or more operators stationed at the rear part of the stage appliance so as to conveniently operate the several devices hereinbefore mentioned.

L designates a chair positioned at the central part of the stage for the accommodation of the leader of the orchestra. This chair is carried by a central shaft, l, passing through the stage and adapted to rotate therein. To the lower part of the central shaft, l, is connected an arm, l', and to this arm is pivoted an operating rod, L', extending rearwardly through the stage. In front of the leader's chair is a music rack, M, on which is provided one or more music sheets, m, and a movable sheet, M'. To this movable sheet is attached an operating cord, m², extending rearwardly through the stage appliance. A baton, N, is attached to an operating cord, n, which cord extends through the music stand and is adapted to be operated by the attendant at the rear of the stage setting. The animal occupying the chair, L, may be trained to grasp and wield the baton, N, but when desired, the operator at the rear of the stage setting may manipulate the cord, n.

The operation of my invention will be readily understood from the foregoing description taken in connection with the drawings.

While I have referred to the miniature stage, B, as a "stage setting" and shown it as applied to a main stage, A, back of the foot lights, a, thereon, it is to be understood that the miniature stage, B, may be used alone, that is without the main stage, A. Obviously, the miniature stage, B, may be placed in a position, preferably in a raised position, to be in full view of the audience.

Having thus fully described the invention, what I claim as new, and desire to secure by Letters Patent is:

1. In a theatrical appliance, a stage, an instrument thereon, a station adjacent to the instrument for the accommodation of an apparent performer, and concealed means for operating said instrument.

2. In a theatrical appliance, a stage, a musical instrument exposed to the view of an audience, said instrument having a movable part, a station adjacent to said instrument for the reception of a performer, and means concealed by the stage for operating the movable part of said instrument.

3. In a theatrical appliance, a stage, a plurality of musical instruments positioned on the stage within the view of an audience, each instrument having a movable part, stations adjacent to the instruments for the accommodation of apparent performers, and a plurality of operating devices concealed by the stage, each operating device being associated with the movable part of one instrument.

4. In a theatrical appliance, a stage, a plurality of musical instruments positioned on the stage within the view of an audience, each instrument having a movable part, stations adjacent to the instruments for the accommodation of apparent performers, a separate leader's station, a music rack and baton adjacent to the leader's station, and a plurality of separate operating devices associated with the several parts, said operating devices being concealed by the stage.

5. In a theatrical appliance, a stage, a musical instrument in the form of a violin occupying an exposed position thereon, said violin having a movable bow, a spring for moving the bow in one direction, and a lever for operating the bow.

6. In a theatrical appliance, a stage, a musical instrument in the form of violins each having a movable bow and occupying an exposed position on the stage, a guide in which the bow is free to move, a crank shaft, and links connecting said shaft and the bows.

7. In a theatrical appliance, a stage, a musical instrument having a movable member and positioned on the stage to be exposed to the view of an audience, and operating means concealed by the stage for imparting movement to said movable member of the musical instrument.

8. A theatrical appliance comprising a stage setting having a platform, a background, curtains at the front of the stage setting, a plurality of instruments positioned on the stage and exposed to the view of an audience, and an operating device for each instrument, said device being concealed by the stage setting.

In testimony whereof I have signed my name to this specification in the presence of two subscribing witnesses.

HARRY ROCHEZ.

Witnesses:
H. I. BERNHARD,
JAS. H. GRIFFIN.